US00RE33807E

United States Patent [19]

Abel et al.

[11] E Patent Number: Re. 33,807

[45] Reissued Date of Patent: Jan. 28, 1992

[54] SELF-POWERED SENSOR FOR USE IN CLOSED-LOOP SECURITY SYSTEM

[75] Inventors: William E. Abel, Portland, Oreg.; Douglas H. Marman, Ridgefield, Wash.

[73] Assignee: Sentrol, Inc., Portland, Oreg.

[21] Appl. No.: 524,919

[22] Filed: May 16, 1990

Related U.S. Patent Documents

Reissue of:

[64] Patent No.: 4,745,398
Issued: May 17, 1988
Appl. No.: 12,623
Filed: Feb. 9, 1987

[51] Int. Cl.[5] ..... G08B 23/00

[52] U.S. Cl. ..... 340/500; 340/506; 340/508; 340/518; 340/505

[58] Field of Search ..... 340/500, 518, 505-513, 340/825.06

[56] References Cited

U.S. PATENT DOCUMENTS

| | | | |
|---|---|---|---|
| 4,091,660 | 5/1978 | Yanagi . | |
| 4,404,548 | 9/1983 | Muller et al. | 340/505 |
| 4,413,259 | 11/1983 | Lutz et al. | 340/518 |
| 4,423,410 | 12/1983 | Galvin et al. | 340/505 |
| 4,603,318 | 7/1986 | Philp | 340/505 |

*Primary Examiner*—Donnie L. Crosland

*Attorney, Agent, or Firm*—Chernoff, Vilhauer, McClung & Stenzel

[57] ABSTRACT

A self-powered sensor for a closed-loop security system includes a self-powered sensor network which provides a switch-actuating signal upon the detection of a physical condition. An electronic switch, which is in a normally closed position, is connected between the positive and negative poles of a closed-loop security system and opens the loop upon receipt of the switch-actuating signal thereby triggering an alarm. The self-powered sensor network may include a voltage doubler for converting the AC output of a transducer to a DC voltage of an amplitude sufficient to open the switch. When the switch is opened, voltage from the closed-loop security system becomes available to power a visible or audible alarm identifying the sensor that opened the loop.

16 Claims, 2 Drawing Sheets

SELF-POWERED SENSOR FOR USE IN CLOSED-LOOP SECURITY SYSTEM

Matter enclosed in heavy brackets [ ] appears in the original patent but forms no part of this reissue specification; matter printed in italics indicates the additions made by reissue.

The following invention relates to a self-powered sensor for use in security systems and more particularly for use in a closed-loop security system in which an alarm is triggered by the opening of the loop.

A closed-loop security system is described in patent application Ser. No. 644,918, now abandoned, and assigned to the same assignee. In the aforementioned patent application, a closed-loop security system consists of a current source, a voltage threshold detector and a plurality of sensors connected in series, each sensor having a MOSFET output switch. One drawback to such a system is that it is necessary for the sensors connected to the closed-loop security system to be battery-powered. This is problematical in a security system which must monitor a variety of physical conditions in a variety of environments. For example, battery-powered sensors are not practical in environments where the temperature may be very low. In most portions of the country winter temperatures can remain below freezing for extended periods of time. Sensors positioned to monitor physical events outdoors, or outside a temperature controlled structure, may be inoperative because the batteries may cease to function at such low temperatures. Moreover, even when not in use, battery-powered sensors draw a small amount of quiescent current which will eventually deplete the battery. In a closed-loop security system battery depletion would go undetected, and the batteries must, therefore, be periodically changed.

Thus, a need exists in closed-loop security systems for a self-powered sensor; that is, one which can create an electrical signal and open the closed-loop without the need for an auxiliary battery. In the past, such sensors have been available, an example of which is a sensor shown in Yanagi U.S. Pat. No. 4,091,660. The Yanagi device, however, is not coupled to a closed-loop security system, but utilizes a silicon control rectifier (SCR) to close a circuit between a pair of contacts. Thus, the Yanagi device is useful only in an open-loop system such as that shown in Muller U.S. Pat. No. 4,404,548. Yet another problem with the Yanagi device is that it uses a relatively large number of components to develop the signal needed to control the SCR. It is desirable in sensing devices of this type to use as few circuit components as possible so that the devices may be made less expensive and smaller, and also less obtrusive.

Closed-loop security systems have been available in the past, but have used mechanical contacts such as reed switches or relays which are opened by an actuating signal. One advantage of closed-loop security systems is that they are self-supervising; that is, when a component fails or is removed from the system the loop is opened and an alarm is turned on. Mechanical switches, however, are prone to failure where the contacts may become fused together due to contact metal migration so that the switch does not open when a triggering event occurs. Also, relatively large amounts of power are needed to open mechanical contacts, and this makes such switches impractical for use in systems where batteries are not used to power the sensors.

SUMMARY OF THE INVENTION

The present invention comprises a self-powered sensor network for a closed-loop security system and includes a transducer for providing an output signal for opening a switch upon detecting a physical event. An electrical network responds to the output signal, which may be a transient AC signal, and develops a switch-opening DC signal. An electronic switch which is normally closed, connecting positive and negative leads from a closed-loop security system, responds to the switch-opening signal, thereby interrupting current flow through the closed loop which thereby triggers an alarm.

The self-powered transducer is one which does not require a battery, but which develops a transient electrical signal upon detection of a physical event of interest. For example, the transducer may comprise a piezoelectric crystal, sensitive to sound or vibration, a photodiode, or a thermocouple. Some sensors of the above type provide only a transient AC signal, but such a signal can be converted to a DC signal of sufficient voltage to open an electronic switch such as a normally closed field effect transistor (FET). If the transient AC signal is not of sufficient magnitude a voltage doubler may be used for the AC to DC conversion process. An FET is particularly advantageous for this purpose due to its extremely low input power requirements at DC and low frequencies. This permits operation with input signals of very low power. FETS are also available with very low output resistances when turned "ON". This permits a large number of such sensing networks to be connected in series without appreciably raising the voltage threshold.

Another feature of the invention resides in the fact that the loop voltage from the closed loop security system becomes available when any of the switches in the system are opened. This voltage may therefore power a remote alarm indicator such as a light or a sonic device near the location of the sensor, thus providing an indication of which sensor trips the alarm.

It is a primary object of this invention to provide a self-powered sensor for use in a closed loop security system which obviates the need for batteries, and is thus economical and easy to maintain while maintaining the advantages of closed-loop systems.

A further object of this invention is to provide a closed loop security system which may be supervised so that failures of components within the system are immediately apparent.

Yet a further object of this invention is to provide a closed-loop security system using a normally closed JFET or depletion-mode MOSFET transistor which may be turned off by the voltage derived from a self-powered sensing network.

A still further object of this invention is to provide a closed loop security system having self-powered sensors wherein a break in the closed loop system automatically provides a voltage to one of the sensors responsible for the alarm.

Another object of this invention is to provide a simple and economic self-powered sensor using a minimal amount of components.

The foregoing and other objectives, features and advantages of the present invention will be more readily understood upon consideration of the following detailed description of the invention taken in conjunction with the accompanying drawings.

DETAILED DESCRIPTION OF THE INVENTION

A self-powered sensor 10 includes a piezoelectric transducer P1 which includes a piezoelectric element 11 sandwiched between plates 13 and 15. The transducer P1 is coupled to a capacitor C1 which is, in turn, connected to the gate electrode of JFET transistor Q1. Q1 includes a drain electrode D connected to the positive terminal of a closed loop security system to be described below. The source electrode S is connected to the negative terminal of the closed-loop security system. Connected across the source and drain electrodes of Q1 is a zener diode D2 which serves to protect the JFET transister Q1 from an unforseen surge in voltage from the closed loop security system. A resistor R1 is connected between plates 13 and 15 of transducer P1 and a zener diode D1 is connected in parallel with resistor R1. A second resistor R2 is connected between the gate electrode G of Q1 and ground.

Figure 7:
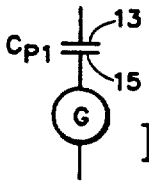
FIG. 7 is an equivalent electrical schematic of transducer P1 in FIG. 1.

When stimulated by a physical impact or a shock, the generator portion "G" of the transducer P1 (see FIG. 7) emits a series of transient alternating voltage pulses. The plates 13 and 15 of the piezoelectric transducer P1 form a capacitor (refer to FIG. 7) which, together with R1, forms a high pass filter so that low frequency phenomena are filtered and will not trigger an alarm. Prior to the arrival of a transient AC voltage signal the gate of Q1 is at zero volts relative to its source terminal and is therefore turned "ON" (i.e. its output appears as a closed switch to a closed loop security system).

Figure 1:
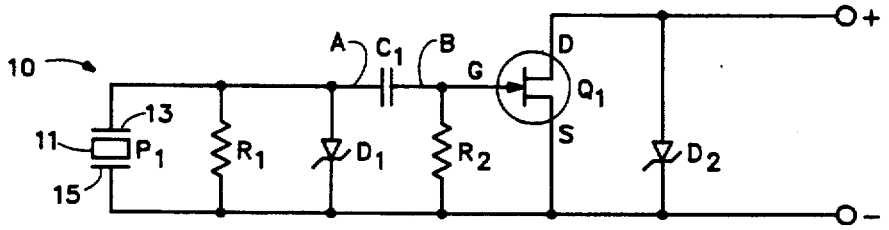
FIG. 1 is a schematic drawing of a self-powered sensor constructed according to the present invention.
Figure 3:
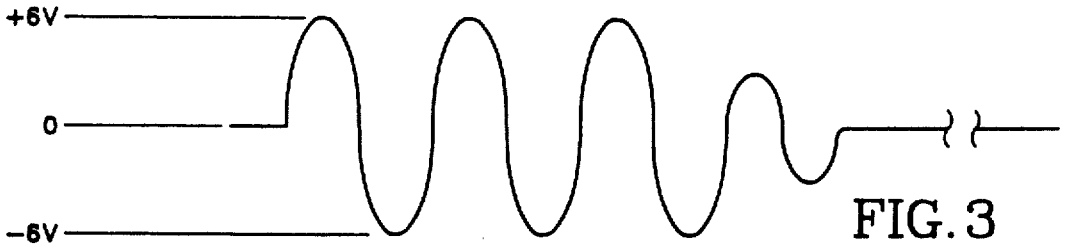
FIG. 3 is a waveform diagram of the voltage output of the piezoelectric transducer in FIG. 1.
Figure 4:
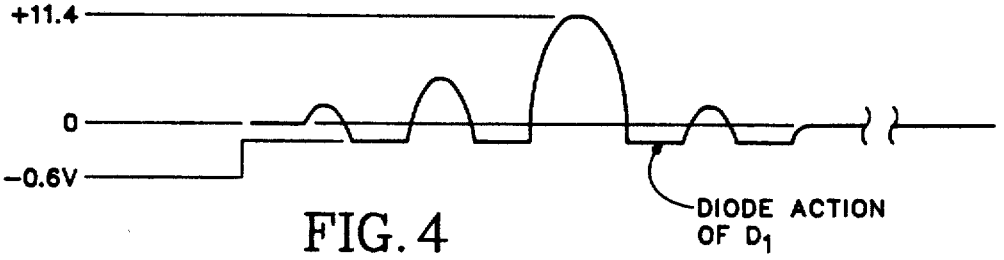
FIG. 4 is a voltage waveform diagram of the voltage at point A in FIG. 1.
Figure 5:
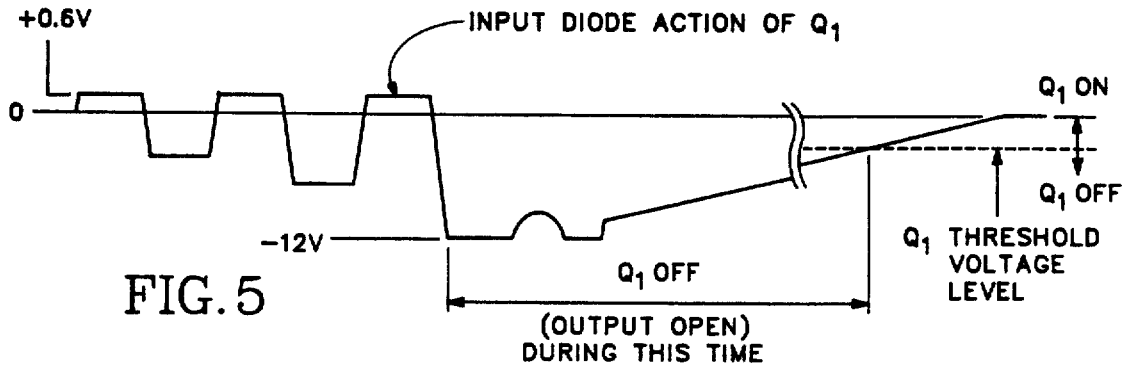
FIG. 5 is a voltage waveform diagram of the voltage on the gate electrode of the JFET transistor in FIG. 1.

FIG. 3 shows a typical transient AC voltage signal produced by P1. FIG. 4 shows the resulting voltage waveform at point A in FIG. 1 and FIG. 5 shows the resulting voltage waveform at point B in FIG. 1.

The first positive-going voltage pulse shown in FIG. 3 charges the capacitor portion CP1 of P1 and C1 in inverse proportion to their respective values. The following negative voltage reverse charges the capacitor in P1 due the forward diode conduction of D1. P1 capacitor plate 13 is now positive and plate 15 is negative. The next positive-going voltage pulse adds a portion of the stored voltage of the capacitor CP1 plus the voltage of the positive-going voltage pulse from "G" or P1 to capacitor C1. This process is repeated with each cycle of the transient AC voltage signal until C1 is charged to approximately twice the peak voltage level of the transient AC voltage. When the transient AC voltage pulses cease, point A in FIG. 1 returns to approximately 0 volts due to the action of R1 and the voltage at point B is thus negative due to the stored charge in C1. R2 is typically of a much higher value (i.e. greater than 10 times) the value of R1. This negative voltage at point B turns off Q1 which produces an extremely high resistance across its output drain and source terminals (i.e. its output appears as an open switch to a closed loop security system). R2 gradually discharges C1. After a period of time determined by the value R2 the negative voltage at point B will decrease to the threshold voltage level of Q1 and Q1 will again turn on (i.e. the circuit will automatically reset itself after providing an "alarm" indication to the closed loop security system).

Zener diode D1 normally only functions as a forward biased diode. However, in the case of abnormally large AC voltage pulses from P1 it also conducts in the reverse (zener) direction thus limiting the maximum input voltage to the gate of Q1 to a safe level.

Figure 6:
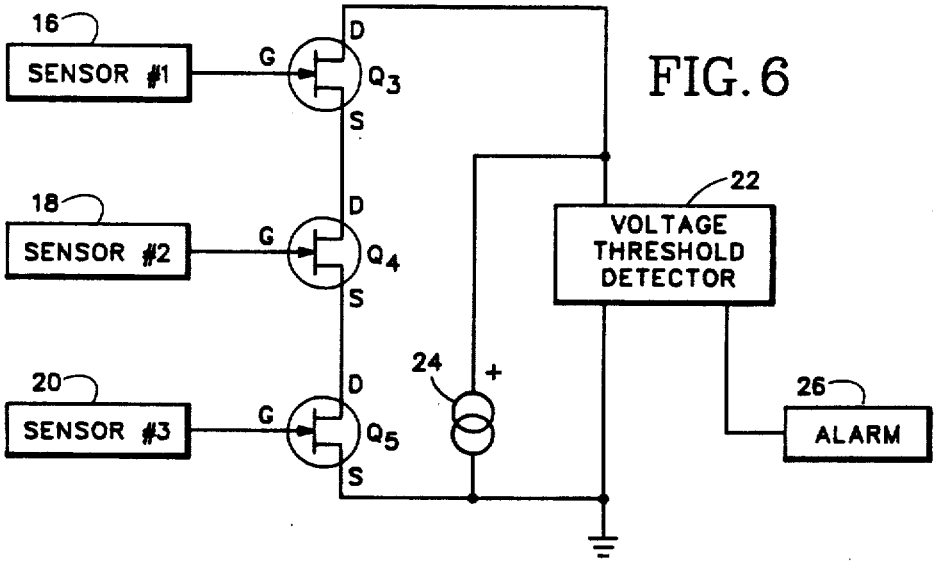
FIG. 6 is a block schematic diagram of a closed-loop security system using the self-powered sensors of the present invention.

Referring now to FIG. 6, there is shown a closed-loop security system which comprises sensors 16, 18 and 20 coupled to JFET transistors Q3, Q4 and Q5 which are connected in series with voltage threshold detector 22. The aforementioned loop is powered by a current source 24. Connected to the output of voltage threshold detector 22 is an alarm 26 which may be of any conventional type.

As explained with respect to the sensor network 10 of FIG. 1, the loop switches Q3, Q4 and Q5 are JFET transistors and are therefore normally closed, thus permitting current from current source 24 to flow through the loop at a very low voltage. When one of the switches opens, however, the continuity of the loop is broken and the loop voltage rises to some predetermined value determined by the output capability of current source 24. The rise in voltage is detected by the threshold detector 22, and at an appropriate level, alarm 26 is turned on.

The self-powered sensing network of FIG. 1 is constructed using a minimum number of components so as to make the sensor and the associated network as small, and therefore as unobtrusive, as possible. For example, transducer P1 includes a capacitor comprising plates 13 and 15 which act both as a part of the high pass filter (formed by the parallel connection of R1) and as part of the voltage doubling network. The second diode in the voltage doubling network is formed by the gate-source junction in Q1. It is this junction which, acting as a diode, prevents point B from going positive when a positive pulse from P1 is present at point A thus charging C1. Thus, the voltage-doubling network comprises not only C1 and D1 but also the diode formed by the gate-source junction of Q1 and the parallel plates 13 and 15 of transducer P1. Diode D1 also performs a dual function as described above. This provides an economy both in size of the unit 10 and in the cost of manufacturing such units.

Figure 2:
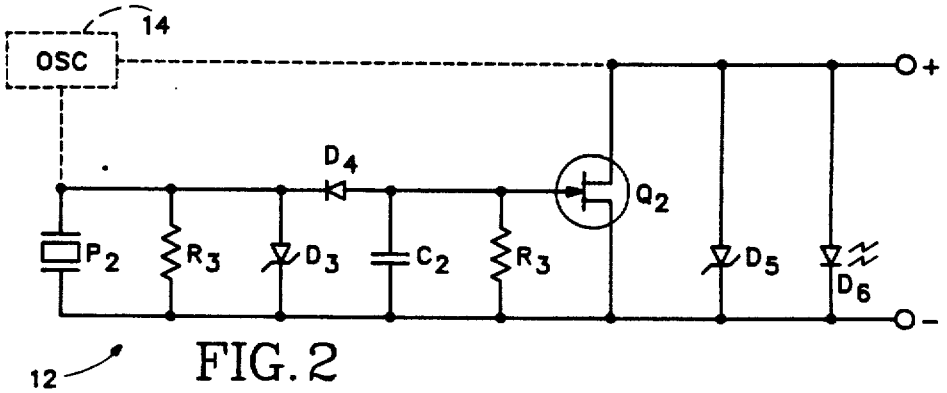
FIG. 2 is a second embodiment of a self-powered sensor constructed according to the present invention and having alarm means powered by voltage from the closed-loop security system.

A second embodiment of the invention is shown in FIG. 2. In FIG. 2 a self-powered sensing network 12 comprises a transducer P2 which together with resistor R3 forms a high pass filter. A zener diode D3 is connected in parallel with R3 and diode D4. Coupled between D4 and ground is capacitor C2 and time constant resistor R3. A JFET transistor Q2 is connected between the plus and minus terminals of the network 12 which may be connected to a closed-loop security system of the type shown in FIG. 6. A light-emitting diode D6 is connected between the source and drain electrodes of Q2 as is protection zener diode D5. An optional feature shown in phantom line in FIG. 2 is an oscillator 14 which may be connected between the positive terminal of network 12 and transducer P2.

The operation of the network 12 is similar in many respects to the operation of the device shown in FIG. 1. The positive portion of any transient AC wave from P2 shorts to ground through D3. When the wave goes negative, however, D3 prevents any current flow to the positive plate P2, and P2 charges like a capacitor. Since C2 is connected in parallel with P2, C2 charges as well since current is pulled through D2 which negatively charges C2. This brings the potential of the gate of Q2 below the gate threshold voltage, turning Q1 off. Q2 then stays off because diode D4 prevents any current flow towards the gate of Q2. Thus, this circuit allows a transient to put Q2 in an off position and Q2 will stay off until C2 discharges through R3. If R3 is a very large resistor, Q2 may stay turned off for a relatively long period of time.

When Q2 is turned off, voltage is made available at the positive terminal of the network 12. Thus, current may flow through light-emitting diode D6 providing a visual indication identifying the network 12 as the sensing network that produced the open-loop condition which is indicated by alarm unit 26. The internal resistance of D6 is much higher than the drainsource electrode connection at Q2 when Q2 is on. Thus when Q2 is closed, all current flows between the drain and source of Q2 and no current flows through D6. With Q2 turned off, however, D6 provides a current path between the positive and negative poles of network 12. In the alternative, oscillator 14 may be used to stimulate P2 so that it emits a sound. The oscillator 14 is powered by voltage from the closed-loop system such as that shown in FIG. 6, because when Q2 is turned off, voltage is available at the positive terminal of network 12.

The invention has been described using JFET transistors as loop switches. However, depletion-mode MOSFETS could also be used. Depletion-mode MOSFETS, however, will require an additional diode between the gate and source terminals when used in the circuit of FIG. 1 because there is no internal junction which can perform the diode function needed in the voltage doubling network. The circuit of FIG. 2, however, requires no additional diode due to the presence of D4. Other normally closed electronic switches may also be used, the operating characteristics of such switches being well-known in the art.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A self-powered sensor for a closed-loop security system, comprising:

(a) self-powered sensor network means for providing a switch actuating signal upon the detection of a physical condition wherein said self-powered sensor network means comprises transducer means, said transducer means having a pair of plates separated by a piezoelectric element and having a transient alternating current output, and voltage doubling circuit means responsive to the output of said transducer means, said pair of plates forming a charge storage element of said voltage doubling circuit means, for approximately doubling the peak voltage output of said transducer means to provide said switch actuating signal for a predetermined period of time; and (b) electronic switch means, said electronic switch means having a semiconductor junction forming a diode included in said voltage doubling circuit means, said electronic switch means being in a normally closed position thereby allowing current in said closed-loop security system to flow therethrough, for opening said closed-loop security system in response to said switch actuating signal.

2. The self-powered sensor of claim 1 wherein said electronic switch means comprises a JFET transistor.

3. The self-powered sensor of claim 1 wherein said electronic switch means comprises a depletion-mode MOSFET transistor.

4. The self-powered sensor of claim 1, further including shunt resistor means connected across said plates for providing a high pass filter for said transducer means.

5. The self-powered sensor of claim 1, further including alarm means associated with said sensor and coupled to said closed-loop security system wherein voltage made available by the opening of said closed loop security system is used to provide power for said alarm means.

6. The sensor of claim 5 wherein said alarm means comprises light-emitting diode means connected in parallel with said electronic switch means.

7. The sensor of claim 5 wherein said self-powered sensor network means includes piezoelectric transducer means and said alarm means comprises an oscillator coupled between said piezoelectric transducer means and a pole of said closed-loop security system for activating said piezoelectric tranducer means so as to cause an audible sound.

8. The sensor of claim 2 wherein said closed-loop security system comprises a positive lead connected to a drain electrode of said JFET transistor and a negative lead connected to a source electrode of said JFET transistor and a voltage threshold detector connected between said positive and negative leads thereby forming a closed loop, said closed loop being powered by a current source.

9. The sensor of claim 1 wherein said self-powered sensor network means comprises a time delay means for maintaining said electronic switch means in an open position for a predetermined period of time after said switch means has been opened by said switch actuating signal.

*10. A self-powered sensor network for a closed loop security system, comprising:*

*(a) self-powered sensor means for providing an electrical signal upon the detection of a physical condition;*

*(b) timing network means responsive to said electrical signal for generating a switch-actuating signal, said switch-actuating signal having a predetermined time period; and*

*(c) electronic switch means coupled to said timing network means, said switch means being in a normally closed position thereby allowing current in said closed loop security system to flow therethrough, and responsive to said switch-actuating signal so as to be open during said predetermined time period.*

*11. The self-powered sensor network of claim 10 wherein said self-powered sensor means comprises transducer means for generating a transient AC signal, and wherein said timing network means includes rectifying means for converting said transient AC signal to a DC signal.*

*12. The self-powered sensor network of claim 11 wherein said timing network means includes an RC timing circuit.*

*13. The self-powered sensor network of claim 12 wherein said electronic switch means comprises a JFET transistor.*

*14. The self-powered sensor network of claim 12 wherein said electronic switch means comprises a depletion mode MOSFET transistor.*

*15. The self-powered sensor network of claim 10 further including alarm means associated with said closed loop security system wherein voltage made available by the opening of said closed loop security system is used to provide power for said alarm means.*

*16. The self-powered sensor network of claim 15 wherein said closed loop security system includes a current source connected in series with a plurality of said electronic switch means and a voltage threshold detector connected in parallel with said current source, said voltage threshold detector having an output coupled to said alarm means.*

* * * * *

UNITED STATES PATENT AND TRADEMARK OFFICE

CERTIFICATE OF CORRECTION

PATENT NO. : RE33807

DATED : January 28, 1992

INVENTOR(S) : William E. Abel et al.

It is certified that error appears in the above-identified patent and that said Letters Patent is hereby corrected as shown below:

| | | | |
|---|---|---|---|
| Col. 2 | Line | 61 | After "sensors" insert --which may be used to indicate the particular sensor--. |
| Col. 5 | Line | 15 | Delete "Q1" and insert --Q2-- in place thereof. |

Signed and Sealed this

Twenty-ninth Day of June, 1993

*Attest:*

*Attesting Officer*

Michael K. Kirk

MICHAEL K. KIRK

*Acting Commissioner of Patents and Trademarks*